(12) United States Patent
Coleman et al.

(10) Patent No.: US 6,234,344 B1
(45) Date of Patent: May 22, 2001

(54) CANDY RACER

(76) Inventors: Thomas J. Coleman, 19170 Paddock Pl., Abingdon, VA (US) 24211; William K. Schlotter, IV, 117 Wateredge La., Fredericksburg, VA (US) 22406; Princess Ann Coleman, 19170 Paddock Pl., Abingdon, VA (US) 24211; Ann M. Schlotter, 117 Wateredge La., Fredericksburg, VA (US) 22406

( * ) Notice: Subject to any disclaimer, the term of this patent is extended or adjusted under 35 U.S.C. 154(b) by 0 days.

(21) Appl. No.: 09/453,041

(22) Filed: Dec. 2, 1999

(51) Int. Cl.$^7$ ........................................ A24F 15/04
(52) U.S. Cl. ............................... 221/24; 198/724
(58) Field of Search ...................... 221/24, 75, 155, 221/192, 194, 265, 282; 198/778, 724, 658

(56) References Cited

U.S. PATENT DOCUMENTS

| | | |
|---|---|---|
| 4,560,086 | 12/1985 | Stol . |
| 4,759,469 | 7/1988 | Lowrance et al. . |
| 4,834,263 | 5/1989 | Becze et al. . |
| 4,889,259 | 12/1989 | Lowrance et al. . |
| 5,452,822 | 9/1995 | Haymond . |
| 5,782,378 | 7/1998 | Hart et al. . |

*Primary Examiner*—Kenneth W. Noland
(74) *Attorney, Agent, or Firm*—Melvin L. Crane

(57) ABSTRACT

A candy racer designed so that a child can observe a piece of candy racing along a track within a plastic housing. The track is formed by an inner housing with a spiral surrounding the inner housing so that candy follows the spiral from an upper reservoir to a lower reservoir. The upper reservoir has an aperture in the reservoir and an aperture in a rotatable cover on the reservoir in which the two apertures will correspond to permit a piece of candy to be dispensed from the upper reservoir when the upper reservoir is in a down position.

1 Claim, 1 Drawing Sheet

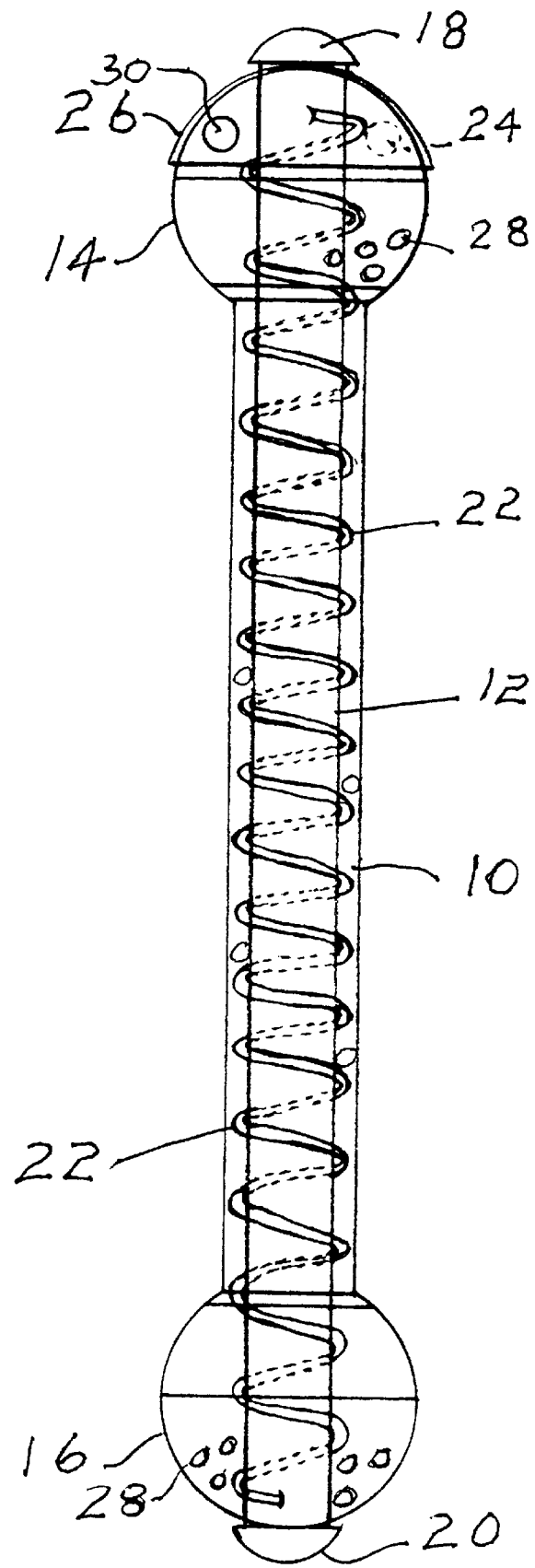

CANDY RACER

This invention is directed to a candy racer and more particularly to a candy device in which candy pieces can travel from one end of the device to the other for consumption and for enjoyment of watching the candy pieces travel from one end to the other.

BACKGROUND OF THE INVENTION

Heretofore, devices have been patented by which objects can travel from an upper end to a lower end so that the objects can be seen as they travel from the upper end to the lower end. These devices also have a reservoir or receptacle at the bottom end which receives the candy pieces for dispensing to a user. Such prior art is restricted to a one-way travel for the pieces.

OBJECTS OF THE INVENTION

It is therefore an object of the invention to provide a candy dispensing device by which an object can travel in each direction through the device. The objects can be dispensed at only one end or both ends if desired.

Another object is to provide a candy/gum dispensing device which permits candy/gum pieces to traverse either direction of the device.

Another object is to provide a device which has no distinguishable top or bottom.

Yet another object is to provide a device in which either end becomes the top or bottom depending on the manner in which the device is held vertically.

Other more specific objects and advantages will become obvious to those skilled in the art upon a review of the drawings, specification and claims.

BRIEF DESCRIPTION OF THE DRAWING

The sole FIGURE represents a side view of the device.

DETAILED DESCRIPTION

A sole drawing of the invention is shown in which the reference characters will show different parts of the device. The candy racer comprises a main cylindrical housing 10 made of plastic through which the inner parts can be seen. An inner cylindrical housing 12 extends coaxially beyond each end of the housing 10 and beyond spherical end reservoirs 14, 16 which are secured to the ends of the outer housing, or may be made as an integral part of the outer housing.

The inner housing is secured in place by end caps 18 and 20 which are on an outside surface of each of the reservoirs. Within the main housing and between the inner surface of the main housing and the outer surface of the inner housing, a spiral candy track 22 surrounds the inner housing and extends from an upper end of the inner housing within the reservoir 14 down to the lower end of the outer housing and within the lower reservoir 16. The spacing between the outer housing and the inner housing must be a radial distance which is greater than a diameter of the pieces of candy or gum to be dispensed. Further, the axial distance between each spiral must be greater than the diameter of the candy or gum to be dispensed. The spiral need not extend to the inner surface of the outer housing but must extend radially a distance so that the pieces of candy or gum will not drop between the spiral and an inner surface of the outer housing.

The upper reservoir 14 has an aperture 24 in the upper semi-spherical portion of the reservoir of a diameter through which a piece of candy or gum will pass. A semi-spherical dispenser cap 26 is held on the upper end of the reservoir 14 by the end cap that also holds the inner housing in place. The cap 26 is provided with an aperture 30 which matches with the aperture 24 in order to dispense pieces of candy or gum.

In use and for dispensing candy or gum, each reservoir can have candy pieces 28 therein such as illustrated. However, to start with the upper reservoir need not have any candy pieces therein, if so, and a person desires to dispense a piece of candy or gum, the person rotates the upper semi-spherical cover until the outer aperture 30 aligns with the inner aperture 24 in the reservoir 14. The device is rotated so that the lower end becomes the upper end. In doing so, candy pieces will begin to be fed from the then upper reservoir down to the then bottom reservoir. When a candy or gum piece reaches the bottom, the candy or gum can be dispensed through the open apertures 24, 26. Suppose the person desires to play with the device instead of dispense a piece of candy. The person can switch ends again and the candy will travel back to the reservoir. As can be seen, the person can race candy pieces from end-to-end alternately without dispensing candy and/or can dispense a piece of candy at that time with candy in the reservoir and with the apertures open. The choice is made by the person; if the person desires to race candy or gum back-and-forth it can be done or else candy or gum can be dispensed as desired.

It will be obvious that most any spherical size candy or gum can be dispensed so long as the radial spacing between the inner surface of the outer housing and the inner surface of the inner housing is greater than that of a diameter of the candy or gum. Obviously the axial spacing between the spirals must be greater than the diameter of the piece being dispensed. Also the dispensing outlet must be greater in diameter than the piece of candy.

The housing is cylindrical and the end reservoirs are spherical and the end caps are somewhat semi-spherical; therefore, there should not be any sharp parts that would injure a child.

It is believed that the described device will provide enjoyment for a child and also serve to dispense a piece of candy or gum as desired.

The foregoing relates to preferred exemplary embodiments of the invention, it being understood that other variants and embodiments thereof are possible within the spirit and scope of the invention, the latter being defined by the appended claims.

We claim:

1. A candy racer candy or gum dispenser which comprises:

an outer elongated cylindrical housing (10), an inner elongated cylindrical housing (12) having a length greater than said outer housing and coaxial with said first housing, a first reservoir in conformity with a first end of said outer housing and coaxial therewith, a second reservoir in conformity with a second end of said outer housing and coaxial therewith, said inner housing having a first end that extends outwardly of said first reservoir, said inner housing having a second end that extends outwardly of said second reservoir, first and second end caps that secure said inner housing in place, a rotatable dispenser cap (26) secured onto said first reservoir, said first reservoir having an aperture therein, said rotatable dispenser cap having an aperture therein which corresponds with said aperture in said first reservoir, and a spiral track surrounding said inner housing and extending from said first reservoir to said second reservoir, whereby candy in said second reservoir will follow along said spiral track to said first reservoir with said device positioned with said first reservoir in a down position, and candy in said first reservoir will follow said spiral track from said first reservoir to said second reservoir when said second reservoir is in a bottom position, and said candy can be dispensed from said first reservoir when said aperture in said rotatable cover corresponds with said aperture in said first reservoir.

* * * * *